United States Patent [19]
Bushell et al.

[11] Patent Number: 5,441,780
[45] Date of Patent: Aug. 15, 1995

[54] PAPER TUBE WITH INTEGRAL END SUPPORTS

[75] Inventors: Victor Bushell, Atlantic Beach; Robert Dissen, Orange Park, all of Fla.

[73] Assignee: Jefferson Smurfit Corporation, St. Louis, Mo.

[21] Appl. No.: 206,164

[22] Filed: Mar. 7, 1994

[51] Int. Cl.⁶ ........................... F16L 9/16; F16L 57/00
[52] U.S. Cl. .................... 428/34.2; 428/34.3; 428/192; 138/96 R; 138/144; 242/610.4; 242/613.5
[58] Field of Search ............ 428/34.2, 34.3, 192; 138/144, 96 R; 242/613.5, 610.4

[56] References Cited

U.S. PATENT DOCUMENTS

| | | | |
|---|---|---|---|
| 2,336,161 | 12/1943 | Blanchet | 242/613.5 |
| 2,464,278 | 3/1949 | Wilson | 229/5.7 |
| 3,125,802 | 3/1964 | Kevin et al. | 242/613.5 |
| 3,370,615 | 2/1968 | Tamaki et al. | 138/96 R |
| 3,547,367 | 12/1970 | Brazeale | 242/613.5 |
| 3,713,601 | 1/1973 | Buhrman et al. | 242/613.5 |
| 3,737,030 | 6/1973 | Stewart | 242/610.4 |
| 3,990,649 | 11/1976 | Adams | 242/118.32 |
| 4,372,500 | 2/1983 | Saraisky | 242/613.5 |
| 4,497,407 | 2/1985 | Stager | 206/443 |
| 4,531,930 | 7/1985 | Clauss | 493/108 |
| 4,796,668 | 1/1989 | Depret | 138/96 T |
| 5,167,994 | 12/1992 | Paulson | 428/34.2 |

Primary Examiner—Ellis P. Robinson
Assistant Examiner—Rena L. Dye
Attorney, Agent, or Firm—Paul M. Denk

[57] ABSTRACT

A paper tube and method of making the same, having plastic end ring supports and a uniform inside diameter and uniform outside diameter, end-to-end, including the supports. The tube is formed from a multiple ply paper wall. A poly-coated ply is formed at the midpoint of the wall thickness. An annular cut is made interiorly within each end to the poly-coated ply midpoint. A section of wall defined by the cut is removed creating an annular rabbet within each end. An end support ring is inserted in each end. The ring has a body section with an outside diameter equal to the outside diameter of the tube and an inside diameter equal to the inside diameter of the tube. An annular collar extends from one side of the ring body. The collar has an outside diameter equal to the inside diameter of the rabbet. The collar seats in the rabbet and the body abuts the end of the tube resulting in a tube having uniform outside diameter and uniform inside diameter, end-to-end, including the support rings.

1 Claim, 1 Drawing Sheet

PAPER TUBE WITH INTEGRAL END SUPPORTS

BACKGROUND OF THE INVENTION

This invention relates generally to paper wound tubes, more specifically to an elongated paper tube, and method of making the same, having supportive end rings that seat in rabbets formed within each end of the tube so that the outside and inside diameters of the paper tube, are uniform, end-to-end, including the support rings.

Elongated paper tubes are known to the art. Such tubes are generally spirally or convolutely wound. Generally, such tubes are used to support a variety of materials depending upon the length and relative strength of the tube. For example, lightweight paper products, such as toilet paper and paper towels, are wound around relatively short, small diameter, lightweight paper tubes. These tubes are designed for single use and are discarded when the paper product is exhausted.

Heavier gauge tubes generally are used to wind yarn or cloth, or for holding heavy items such as carpeting. These tubes must have a smooth finish and uniform outside diameter to allow even winding and to prevent snagging of delicate materials wrapped about the tube. Furthermore, heavy-duty paper tubes are employed in the carpet industry to hold a roll of carpet. These large tubes are usually supported on mandrels so that the product can be loaded onto the tube or removed from the tube.

The heavy gauge, long tubes are relatively expensive to manufacture. Therefore, it is advantageous to form a heavy-duty paper tube that can be reused rather than discarded, and yet retain structural integrity. For the most part, the span of the paper tube covered by product stays intact and is reusable. However, the open ends of the tubes, especially the ends which extend out from under the material loaded thereon, can be damaged, rendering the tubes unusable after one application. Moreover, support or protective means applied to the ends of the tubes generally result in an end of a tube that has a greater or lesser inside or outside diameter, at the ends, than the inside or outside diameter of the body of the paper tube to which the end supports are attached. This results in an uneven wrapping or winding of a product on the paper tube. Furthermore, if the inside diameter of the ends of the paper tube is different from the inside diameter of the paper tube itself, the paper tube does not function as well on a mandrel.

SUMMARY OF THE INVENTION

It is therefore, a principal object of the present invention to provide a paper tube having protective support rings at each end that has a uniform inside and a uniform outside diameter, end-to-end, including the support rings.

Another object of the invention is to provide a paper tube having a poly-coated ply of paper at the mid-point of the wall thickness of the paper tube to permit the formation of a rabbet by facilitating the cutting and removal of an annular ring from the wall thickness down to the coated ply in each inner end of the tube.

Still another object of the present invention is to provide a paper tube having protective support rings formed with a body section having an outside diameter equal to the outside diameter of the tube, an inside diameter equal to the inside diameter of the tube, and concentric collar extending from the body section that seats within the rabbet.

Yet another object of the invention is to provide a paper tube that is economical and easy to construct, durable, reusable, and well suited for intended purposes.

Briefly stated, a paper tube is provided having a one-sided poly-coated ply of paper formed at the mid-point of the wall thickness. The ply is run with gaps to allow some adhesive to bleed through to hold the tube together. An annular cut is made inside each end of the tube to the mid-point poly-coated ply and the severed section is easily removed creating an annular rabbet. A protective support ring, having a body and a concentric collar, is mounted in each end. The body of end ring has the same outside diameter as the outside diameter of the paper tube and abuts the tube. The collar has the same outside diameter as the inside diameter of the rabbet. The collar seats in the rabbet. The inside diameter of the ring is the same as the inside diameter of the paper tube. The finished tube has a uniform inside and outside diameters, end-to-end, including the protective support rings.

DESCRIPTION OF THE PREFERRED EMBODIMENT

Figure 1:
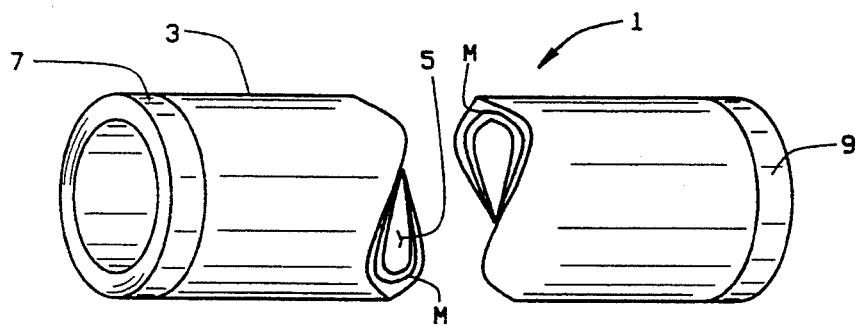
FIG. 1 is perspective view of a paper tube of the present invention.

A paper tube constructed in accordance with the present invention, as indicated generally by reference numeral 1 in FIG. 1. Tube 1 has an elongated tubular body section defining an inner bore 5 and a pair of end support rings 7 and 9. Individual elements and construction of tube 1 will be described in greater detail hereinafter.

Figure 2:
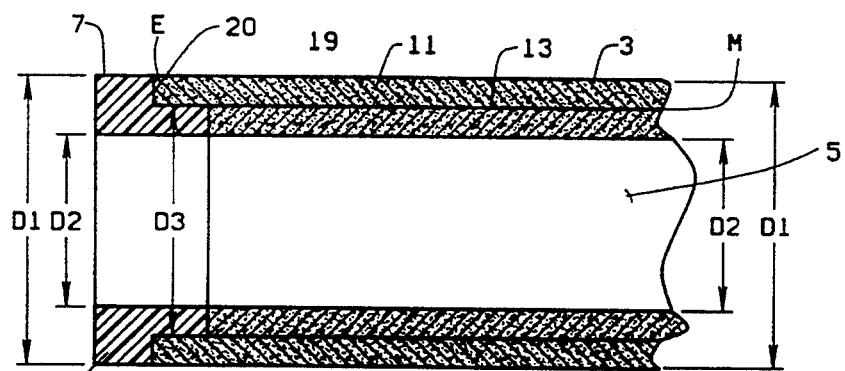
FIG. 2 is a cross-sectional view of an end of the paper tube of the present invention.
Figure 3:
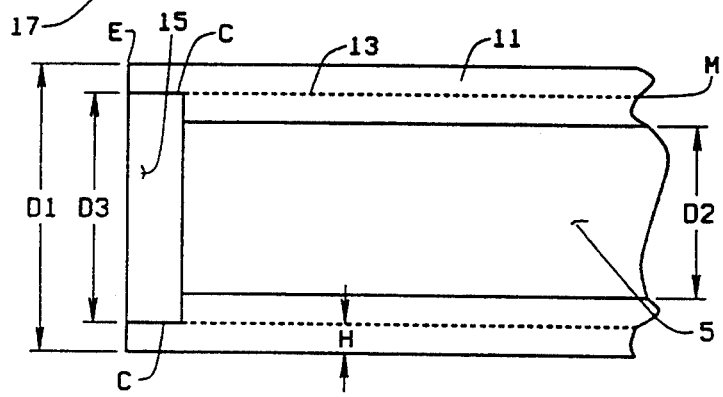
FIG. 3 is a schematic view of an end of the paper tube of the present invention.

The construction of tube 1 is shown in greater detail in FIGS. 2 and 3. Body 3 is a paper tube formed of multiple plies of spirally or convolutely wrapped paper constructed generally in accordance with procedures known to the art. Body 3 has a uniform outside diameter $D_1$, end-to-end. The length, thickness, and weight of body may vary in accordance with the application of tube 1. For example, a tube 1 designed to hold carpet or other such heavy materials thereon, would be constructed having a relatively substantial body section 3. The plies forming body section 3 are wrapped or wound and adhered together with a suitable adhesive, known to the art, to form tubular wall 11. Wall 11 defines an inner bore 5. Bore 5 has a uniform inside diameter $D_2$ from end-to-end of body 3. At a midpoint M in the thickness of wall 11 there is a poly-coated paper ply 13. The poly-coated ply 13 has a suitable poly-coated on the inside side, i.e. the side adjacent bore 5. Ply 13 is run with enough gap so that some adhesive will bleed through ply 13 to provide enough adherence to prevent wall 11 from coming apart or telescoping.

During the manufacture of tube 1, a suitable cutting tool is inserted into each end E of body 3. An annular cut C is made in each end of body 3 through wall 11 to the depth of poly-coated ply 13. The severed or cut-out section (not shown) defined by the cut is removed. Due to the presence of poly-coated ply 13 at midpoint M, the cutout section can be easily pulled away from wall 11 creating an annular rabbet 15 in each end of body 3. Rabbet 15 has an inside diameter $D_3$, which is greater than the inside diameter of $D_2$ of bore 5. The cut may be made at any suitable point within an E. In one preferred embodiment, for example, the cut is made three (3) inches from ends E of body 3. It is likely that such cuts could be made on the exterior of the wound tube to accommodate the following identified rings.

Figure 4:
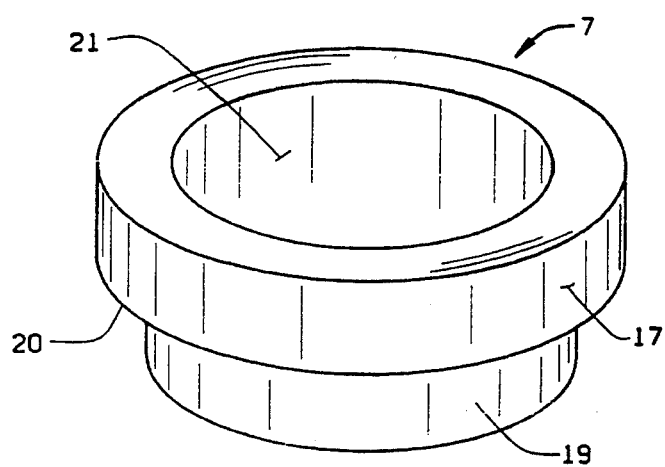
FIG. 4 is a perspective view of an end ring element of the tube of the present invention.
Figure 5:
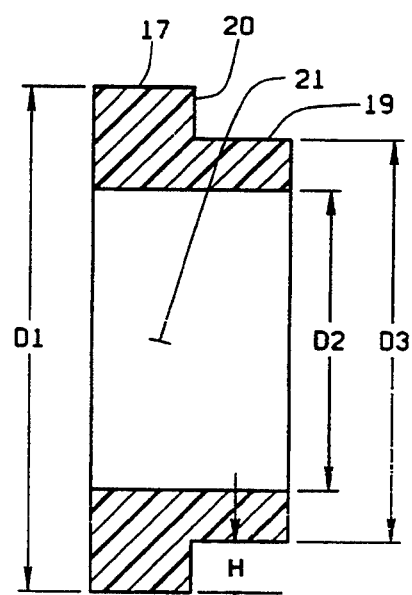
FIG. 5 is a cross sectional view of an protective support ring of the paper tube of the present unit.

Support rings 7 and 9 are inserted into ends E of body 3 and held in place with an appropriate adhesive or other appropriate means. Rings 7, with ring 9 being identical thereto, is best illustrated in FIGS. 4 and 5. Ring 7 has an annular body portion 17. The outside diameter of body 17, $D_1$, is equivalent to the outside diameter of $D_1$ of body section 3. Body section 17 has a concentric collar portion 19 extending therefrom. A shoulder 20 is created between body section 17 and collar 19. Shoulder 20 is the same height H as half of wall 11 from the outside of wall section 11 to midpoint M. Collar 19 has an outside diameter $D_3$ equal to the inside diameter $D_3$ of rabbet 15. Body 17 and collar 19 define internal bore 21. Bore 21 has an inside diameter $D_2$ which is equal to the inside diameter $D_2$ of body 3. These support rings are made of a high impact plastic so as resist rough handling.

Collar 19 seats in rabbet 15. Shoulder 20 abuts end E of body 3. The outside surface of body 17 is flush with the outside surface of body 3. The outside diameter $D_1$ of tube 1 is uniform, end-to-end, including rings 7 and 9. The inside diameter $D_2$ of tube 1 is uniform, end-to-end, including rings 7 and 9.

It should be apparent to those skilled in the art that various changes and modifications can be made in the paper tube of the present invention without departing from the scope of the appended claims. Therefore, the foregoing description and illustration should be viewed as illustrative only and should not be construed in a limiting sense.

We claim:

1. A paper tube comprising:

an elongated hollow tube section having a first end and second end, each said end having an annular rabbet formed therein;

a first end support ring having a body section and an integral concentric collar section extending from said body section, said collar section seated on said rabbet at said first end of said tube;

a second end support ring having a body section and an integral concentric collar section extending from said body section, said collar section seated on said rabbet formed at said second end of said tube section;

said tube section being comprised of a wound paper wall, forming the tube, said wall having a poly-coated ply provided at its mid-point therein and said poly-coated ply arranged at said mid-point of said paper tube and located in alignment within said tube at the depth of said formed rabbet provided within each said end of said elongated hollow tube section;

each said end support ring body having an outside diameter equal to an outside diameter of said tube section, each said collar having an outside diameter equal to the inside diameter of said rabbet, and each said ring having a bore formed therethrough, said bore having an inside diameter equal to the inside diameter of said tube section, wherein said end support rings are formed from high impact plastic;

the combination paper tube and end support rings having uniform inside diameter, from end-to-end, and a uniform outside diameter from end-to-end, including the said end support rings thereon, and said end support rings being seated interiorly of the rabbeted tube.

* * * * *